Patented Dec. 25, 1934

1,985,526

UNITED STATES PATENT OFFICE 1,985,526

HEAT TREATMENT OF DIATOMACEOUS EARTH

McKinley Stockton, Redondo Beach, Calif., assignor to The Dicalite Company, Los Angeles, Calif., a corporation of Delaware No Drawing. Application August 11, 1933,
Serial No. 684,762

2 Claims. (Cl. 252—2)

The object of my invention is to improve the quality of powdered diatomaceous earth products, both calcined and uncalcined, by subjecting the lump earth, prior to the step of comminution, to a temperature sufficient to produce complete dehydration but insufficient to produce the changes which are the well-known effects of calcination.

Diatomaceous earth (also known as infusorial earth, Kieselguhr etc.) is well known to consist of the microscopic siliceous skeletons or casts of marine or fresh water diatoms. These minute bodies have a tubular or otherwise hollow structure which imparts a high degree of porosity to the mass of which they are composed.

For this reason the quality of porosity, which is the most valued property of diatomaceous earth products, is inherent in the nature of the material of which the powder is composed, and is most highly developed in powdered materials in which the original structure of the diatoms has been the least degraded by crushing. As these siliceous structures are of the most extreme fragility, grinding or crushing cannot be resorted to as a means for reducing the massive earth to the form of a powder, the result being a heavy mass very much reduced in porosity, and it is the invariable practice to comminute by impact, the large lumps as mined being broken in some form of hammer mill while reduction to powder is effected in high speed fans in which the earth is kept in suspension in air.

To briefly describe conventional practice, the lump earth as mined or after air drying is broken into smaller lumps, as say 2" and finer, in a hammer mill, avoiding the production of fines as far as possible. The broken earth is then introduced into a column of heated air or gas moving at high velocity into the suction of a fan. In this fan the lumps are reduced by repeated impacts between blades and case to a powder of the desired fineness, and as this powder is formed it absorbs heat from the hot gas to which it gives up the major portion of its water, emerging from the fan in the cooled gas column as a substantially but far from completely dried powder.

For many purposes the product of this comminution may be directed into a bin and sacked, after undergoing certain air flotations for the separation of oversize particles and flint and other foreign matter and for the fractionation of different grades, these operations being immaterial to the present subject. For other purposes, and particularly for the preparation of earths suitable for filtration or for use as filter aids, the powder is heated in a suitable kiln to calcination temperature. A fluxing or purifying agent may be added in the calcination step, but whether or not a flux is used, the calcined powder will be more or less balled and aggregated and requires another passage through a milling fan to bring it back to the fineness in which it existed prior to calcination.

This prior art practice has certain limitations and disadvantages which are fixed in the nature of the crude earth. Diatomaceous earth holds water very strongly and air drying under any ordinary atmospheric conditions of temperature and humidity rarely reduces the water content below say 8%, even this degree of desiccation requiring extended drying. This relatively complete drying requires so much time, space and labor that as a rule the crude earth is only hastily air dried, if at all, and passes to the breaking mill and thence to the fan pulverizer with a water content ranging from 15% to 30%.

The presence of this water in the earth reaching the fan pulverizer has a pronounced effect in increasing the crushing and degradation of the diatom structure. First, its mere presence toughens the mass, requiring a much more forceful impact to accomplish a given degree of pulverization than would be required if the lump were completely dry and correspondingly brittle. Second, it adds materially to the weight of a mass or particle of unit size and thus increases its inertia and the force with which it is struck by a solid body, such as a fan blade, traveling at any given speed.

The powder emerging from the fan, after pulverization in a current of hot air as described, usually has a temperature ranging from 200° to 250° F. and may have a free water content as low as about 3%, in addition to water of hydration. As bearing on conditions during the actual comminution, however, it should be borne in mind that no great proportion of water is removed until the lumps have been reduced to the powdered form, even coarse grains exposing too little surface to lose any material quantity of water under these low temperature conditions, and therefore the pulverization is mainly performed on masses having substantially their original water content.

Again, almost all crude earths contain more or less clay, a material having no porosity and tending to close the pores of the earth proper. This clay, so long as it remains in hydrated form, has a powerful effect in binding the diatoms into a tough mass resistant to comminution by impact.

Reasoning and experimenting from the basis here laid down, I have discovered that by heating the crude earth to a temperature sufficient to produce dehydration prior to the operation of milling to powder, I am enabled to mill to any given fineness with a smaller expediture of power, a lower impact force, a reduced crushing and degradation of the diatom structure and a consequent important increase in the porosity of the milled product. These beneficial results obtain whether the product is to be used as first milled or is to be calcined and remilled.

Dehydration of the earth and of the clay content may be produced at temperatures as low as 900° F., given sufficient time. At this temperature the operation is too slow to be commercially practicable. At 1200° F. or 100° more or less, depending on the quality of the crude, the dehydrating operation proceeds within commercial time limits and at 1350° is usually very rapid. At a temperature of 1500° to 1600° the effects of calcination begin to show, in particular the clay, which is very much reduced in bonding effect by dehydration, begins to sinter and to increase in cementing action on the diatomaceous structure. For this reason I fix about 1500° F. as the upper limit of my new preheating step.

In order to be of value, this preheating must be performed in advance of the operation of milling to a powder. I may apply it to the lump earth as mined or as air dried, but as I find relatively little damage to the earth in the breaking operation above described, I prefer to apply it to the broken lumps of say 2″ size or smaller. These lumps and such finer fragments as may accompany them may be heated in a rotary kiln, on a hearth or in any other approved heating means, but no benefit will be realized if they are heated in a current of hot air during passage through the comminuting fan.

In addition to loosening the clay bond and rendering the lumps more brittle, this preheating step has the effect of hardening or fixing the structure of the diatom and increasing its resistance to breakage during any subsequent operations of remilling, air separation and packaging. The result is a product which has materially lighter weight and greater porosity if used as such, and which may be calcined at a lower temperature, with less shrinkage and less tendency toward agglomeration, than is possible with a product which has been milled from the hydrated lump.

In brief, my invention consists in heating the crude earth, in large or small lumps but prior to any powdering operation, to a temperature not less than 900° F. nor above 1500° F., to a state of substantial dehydration, and thereafter milling the dehydrated lumps to a powder of the desired fineness. This powder may be subjected to any desired air separations and may be used as such or may be submitted to a calcining operation, with or without a fluxing agent, at a temperature greater than 1500° F. and more usually from 1800° to 2200° F.

An important advantage attending the use of my new preheating step is that it enables me to utilize lower grades of crude earth to produce a finished material having properties at least equal to those of products made by prior art methods from high grade crudes. Raw earths are graded mainly by the porosity of their products, and by conserving the natural porosity of the earth it is possible to produce finished material of any standard of quality with a less careful and close selection of the raw material. This not only reduces mining costs but also renders available a larger proportion of any given natural deposit by reducing the proportion of rejected material. At the same time, the products from selected high grade earths are materially improved in quality, though usually to a lesser degree than those from low grade or run-of-mine earth.

By the application of the described heating step the acid solubility figure is materially decreased and improved. Apparently this is due to the conversion of alkaline constituents into insoluble silicates. In the manufacture of calcined products in which the acid solubility is a material figure, the use of the preheating step, which brings a more porous material to the calcination step, permits of greater shrinkage during calcination while maintaining the same standard of finished porosity, thus permitting in turn a higher calcination temperature and a more complete conversion of alkaline constituents to the insoluble form.

As an example of the desirable results produced by the application of my invention, I cite the following. Two samples of raw earth from different strata were separately treated, first by the method above described as conventional, then by the method above described as being of my invention. The two pairs of samples were then calcined, each pair at the same temperature and that the most suitable for the particular results. After calcination the usual tests were applied with the following results, the figures in the first column being the tests on the sample treated in the conventional manner, those in the second the tests on the sample treated according to my new method, and the third column showing the extent of the improvement.

*First sample*

| Flow rate vs. 30 standard | 120% | 119% | −1 |
|---|---|---|---|
| Clarity | C plus | A minus | |
| Wet density | 22.8 | 18.1 | 4.7 |
| Acid solubility | 3.1 | 3.0 | 0.1 |
| Iron | 0.5 | 0.5 | .0 |
| Oil absorption | 2.33 | 2.87 | 0.54 |

*Second sample*

| Flowrate vs. 30 standard | 140% | 195% | 55% |
|---|---|---|---|
| Clarity | B plus | B | |
| Wet density | 15.6 | 11.1 | 4.5 |
| Acid solubility | 2.8 | 2.5 | 0.3 |
| Iron | 0.5 | 0.4 | 0.1 |
| Oil absorption | 3.20 | 5.15 | 1.95 |

I claim as my invention:

1. The method of milling diatomaceous earth comprising the steps of roasting the crude earth in lump form at a temperature sufficient to produce dehydration but below the temperature at which substantial sintering or shrinkage take place, and only thereafter reducing the earth to the form of a powder of fineness suited for use as a filter-aid.

2. The method of milling diatomaceous earth comprising the steps of air drying the crude earth, roasting the air dried earth in lump form at a temperature sufficient to produce dehydration but below the temperature at which substantial sintering or shrinkage take place, and only thereafter reducing the earth to the form of a powder of fineness suited for use as a filter-aid.

MCKINLEY STOCKTON.